United States Patent
Takada et al.

(10) Patent No.: US 8,879,577 B2
(45) Date of Patent: Nov. 4, 2014

(54) MONITORING SYSTEM, DEVICE, AND METHOD

(75) Inventors: May Takada, Kawasaki (JP); Yuji Ogata, Saitama (JP); Masaki Yamada, Yokohama (JP); Nobuyuki Muranaka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 141 days.

(21) Appl. No.: 13/579,470

(22) PCT Filed: Feb. 14, 2011

(86) PCT No.: PCT/JP2011/053042
§ 371 (c)(1),
(2), (4) Date: Aug. 16, 2012

(87) PCT Pub. No.: WO2011/102317
PCT Pub. Date: Aug. 25, 2011

(65) Prior Publication Data
US 2012/0320928 A1 Dec. 20, 2012

(30) Foreign Application Priority Data
Feb. 18, 2010 (JP) ................................. 2010-033370

(51) Int. Cl.
*H04L 12/26* (2006.01)
*H04B 17/00* (2006.01)
(Continued)

(52) U.S. Cl.
CPC ................ *H04L 45/00* (2013.01); *H04L 47/24* (2013.01); *H04L 47/38* (2013.01); *H04L 67/322* (2013.01); *H04L 47/28* (2013.01); *H04L 67/12* (2013.01); *H04L 69/04* (2013.01); *Y04S 40/16* (2013.01)
USPC ........... 370/468; 370/412; 370/401; 370/259; 340/426.25; 340/506; 455/67.11; 709/224; 715/736

(58) Field of Classification Search
CPC ......... H04L 45/00; H04L 47/38; H04L 67/12; H04L 69/04; H04L 67/322; H04L 47/28; H04L 47/24

USPC ........ 370/259, 401, 412, 468, 477, 901, 908; 340/3.1, 6.1, 426.25, 501, 506; 709/224; 348/143; 386/224; 455/67.11, 455/115.1; 715/736
See application file for complete search history.

(56) References Cited

U.S. PATENT DOCUMENTS 7,319,667 B1 * 1/2008 Biederman .................... 370/231
7,839,926 B1 * 11/2010 Metzger et al. .......... 375/240.01
(Continued)

FOREIGN PATENT DOCUMENTS

| CN | 1645936 A | 7/2005 |
| JP | 07-203053 | 8/1995 |

(Continued)

OTHER PUBLICATIONS

Shintani, Kazushi, et al.; A Design of a Home-server with Remote Monitoring and Development of its Prototype; Dec. 13, 2002; pp. 55-60; IPSJ SIG Notes, vol. 2002, No. 118; ISSN 0919-6072.

(Continued)

*Primary Examiner* — Ahmed Elallam
(74) *Attorney, Agent, or Firm* — Foley & Lardner LLP

(57) ABSTRACT

Provided is a monitoring system which can perform priority control in accordance with the wideband limitation. A priority/filter type selection processing unit (37) of a network interconnection device (11), which connects a local network (14) and a wide area network (10), selects a transmission data selection processing unit (38) on the basis of the priority level definitions of a transmission data in accordance with an event status, and a data compression method in association with the event status and the wide area network communication status, and selects and controls a filtering processing unit (33). As a consequence, the communication bandwidth in a wide area network is reduced.

14 Claims, 17 Drawing Sheets

(51) Int. Cl.
*G06F 15/177* (2006.01)
*H04L 12/811* (2013.01)
*H04L 29/08* (2006.01)
*H04L 12/841* (2013.01)
*H04L 12/701* (2013.01)
*H04L 29/06* (2006.01)
*H04L 12/851* (2013.01)

(56) References Cited

U.S. PATENT DOCUMENTS

| | | | |
|---|---|---|---|
| 8,504,716 B2* | 8/2013 | Samuels et al. | 709/235 |
| 8,589,579 B2* | 11/2013 | Samuels et al. | 709/231 |
| 2004/0162051 A1* | 8/2004 | Elsey et al. | 455/403 |
| 2005/0132414 A1* | 6/2005 | Bentley et al. | 725/105 |
| 2005/0146608 A1 | 7/2005 | Yosida et al. | |
| 2007/0185989 A1* | 8/2007 | Corbett et al. | 709/224 |
| 2012/0278470 A1* | 11/2012 | Plamondon et al. | 709/223 |

FOREIGN PATENT DOCUMENTS

| | | |
|---|---|---|
| JP | 2000-183960 A | 6/2000 |
| JP | 2000-332761 A | 11/2000 |
| JP | 2001-211450 A | 8/2001 |
| JP | 2004-120201 A | 4/2004 |
| JP | 2005-071007 A | 3/2005 |
| JP | 2007-228081 A | 9/2007 |
| JP | 2009-171471 A | 7/2009 |

OTHER PUBLICATIONS

PCT International Search Report on application PCT/JP2011/053042 mailed Mar. 15, 2011; 2 pages.
China Patent Office action on application 201180009984.4 dated Jun. 5, 2014; 6 pages.

* cited by examiner

FIG. 4
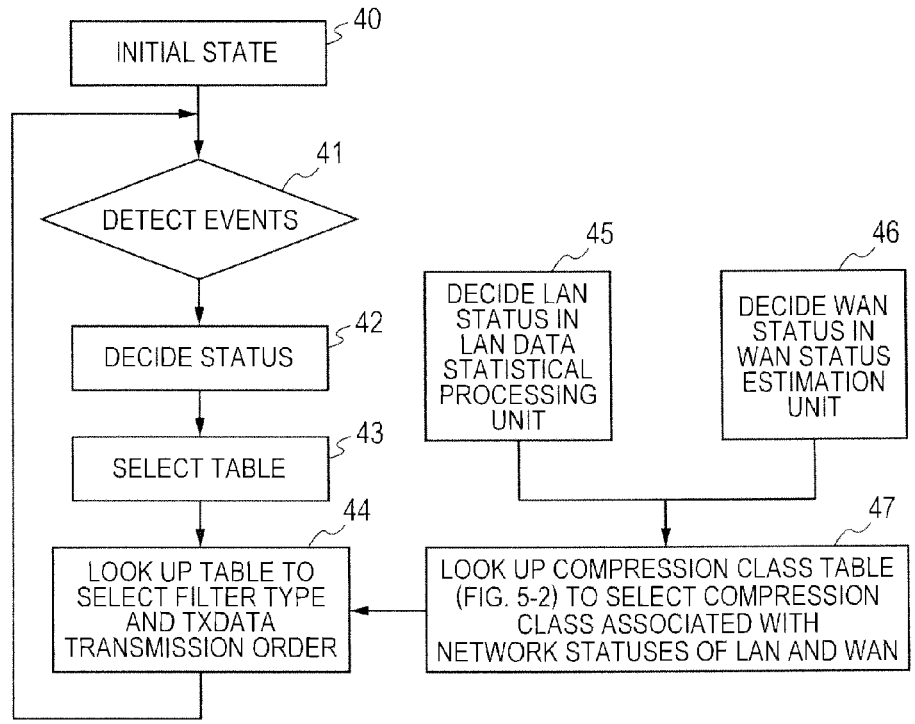
FIG. 5A
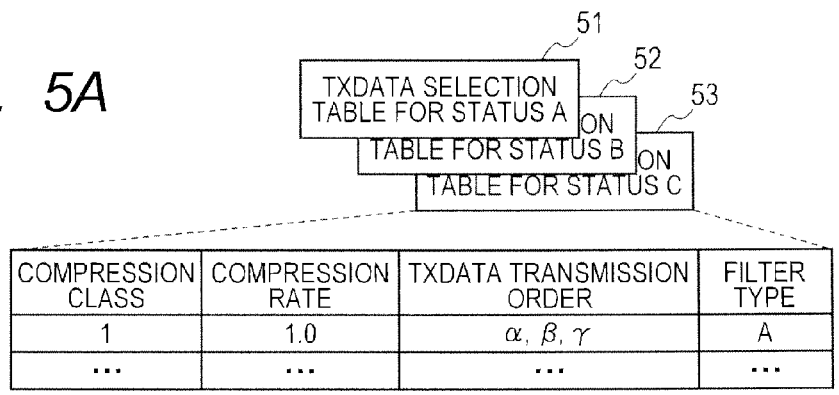
FIG. 5B
|  |  | WAN STATUS | | |
|---|---|---|---|---|
|  |  | SPARSE TRAFFIC | NORMAL | DENSE TRAFFIC |
| LAN STATUS | SPARSE TRAFFIC | 2 | 3 | 4 |
|  | NORMAL | 1 | 1 | 3 |
|  | DENSE TRAFFIC | 1 | 1 | 2 |

FIG. 6A

| COMPRESSION CLASS | COMPRESSION RATE | TXDATA TRANSMISSION ORDER | FILTER TYPE |
|---|---|---|---|
| 1 | 1.0 (NO COMPRESSION) | SENSOR 1<br>CAMERA FOR VIDEO SURVEILLANCE 4<br>SENSOR 2<br>SENSOR 3 | NO FILTERING FOR SENSORS 1 TO 3<br>NO THINNING FOR CAMERA 4 |
| 2 | 0.6 | SENSOR 1<br>CAMERA FOR VIDEO SURVEILLANCE 4<br>ALARM 2<br>ALARM 3 | NO FILTERING FOR SENSOR 1<br>TRANSMISSION OF ONLY RESULT OF ALARM DETECTION FOR SENSORS 2 AND 3<br>CHANGING OF PICTURE SIZE AND LOWERING OF FRAME RATE FOR CAMERA 4 |
| 3 | 0.4 | ALARM 1<br>CAMERA FOR VIDEO SURVEILLANCE 4<br>ALARM 2<br>ALARM 3 | TRANSMISSION OF ONLY RESULT OF ALARM DETECTION FOR SENSORS 1 TO 3<br>TRANSMISSION OF ONLY RESULT OF FEATURE EXTRACTION FOR CAMERA 4 |

FIG. 6B

| COMPRESSION CLASS | COMPRESSION RATE | TXDATA TRANSMISSION ORDER | FILTER TYPE |
|---|---|---|---|
| 1 | 1.0 (NO COMPRESSION) | SENSOR 2<br>CAMERA FOR VIDEO SURVEILLANCE 5<br>SENSOR 1<br>SENSOR 3 | NO FILTERING FOR SENSORS 1 TO 3<br>NO THINNING FOR CAMERA 5 |
| 2 | 0.6 | SENSOR 2<br>CAMERA FOR VIDEO SURVEILLANCE 5<br>ALARM 1<br>ALARM 3 | NO FILTERING FOR SENSOR 2<br>TRANSMISSION OF ONLY RESULT OF ALARM DETECTION FOR SENSORS 1 AND 3<br>CHANGING OF PICTURE SIZE AND LOWERING OF FRAME RATE FOR CAMERA 5 |
| 3 | 0.3 | ALARM 2<br>CAMERA FOR VIDEO SURVEILLANCE 5<br>ALARM 1<br>ALARM 3 | TRANSMISSION OF ONLY RESULT OF ALARM DETECTION FOR SENSORS 1 TO 3<br>TRANSMISSION OF ONLY RESULT OF FEATURE DETECTION FOR CAMERA 5 |

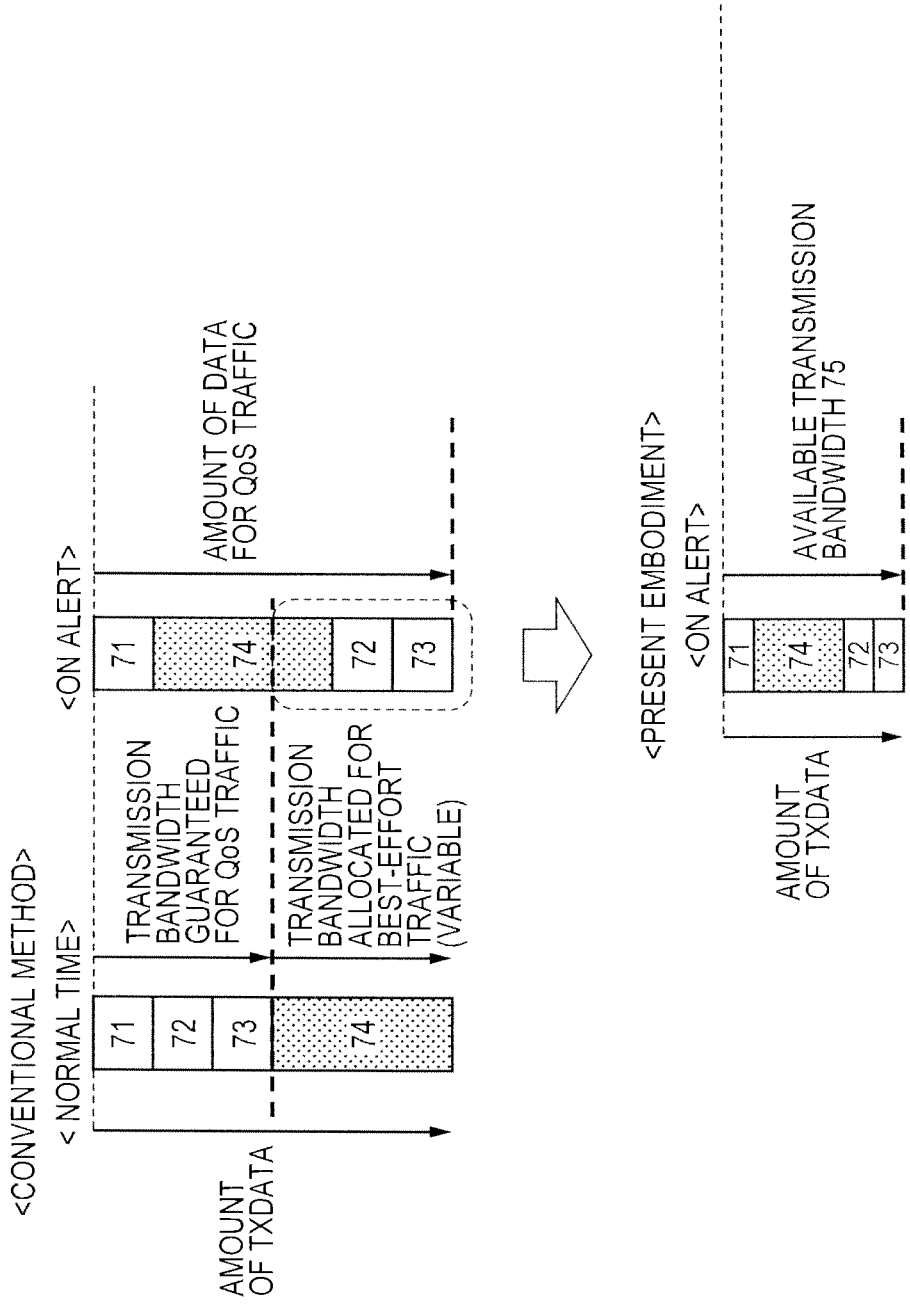

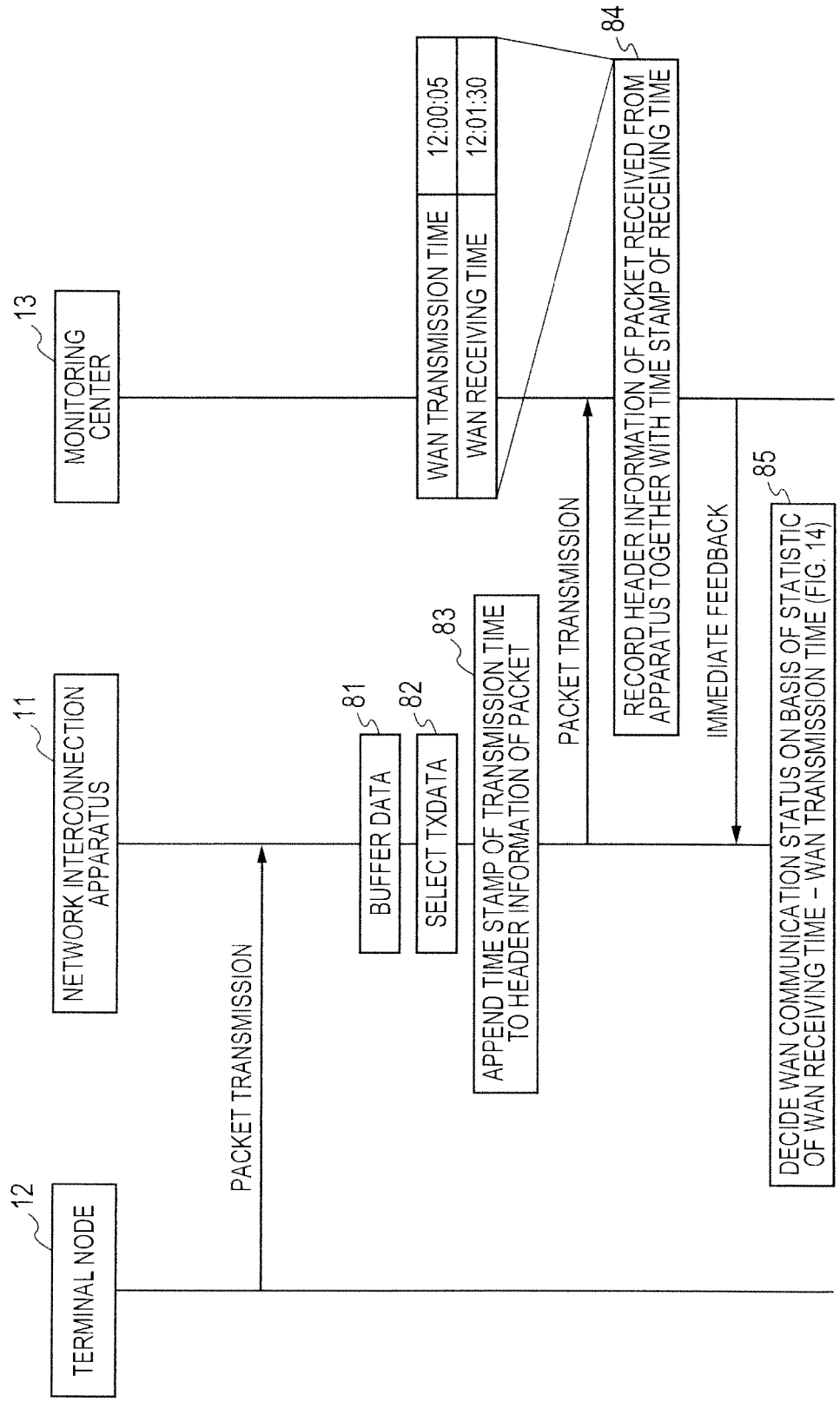

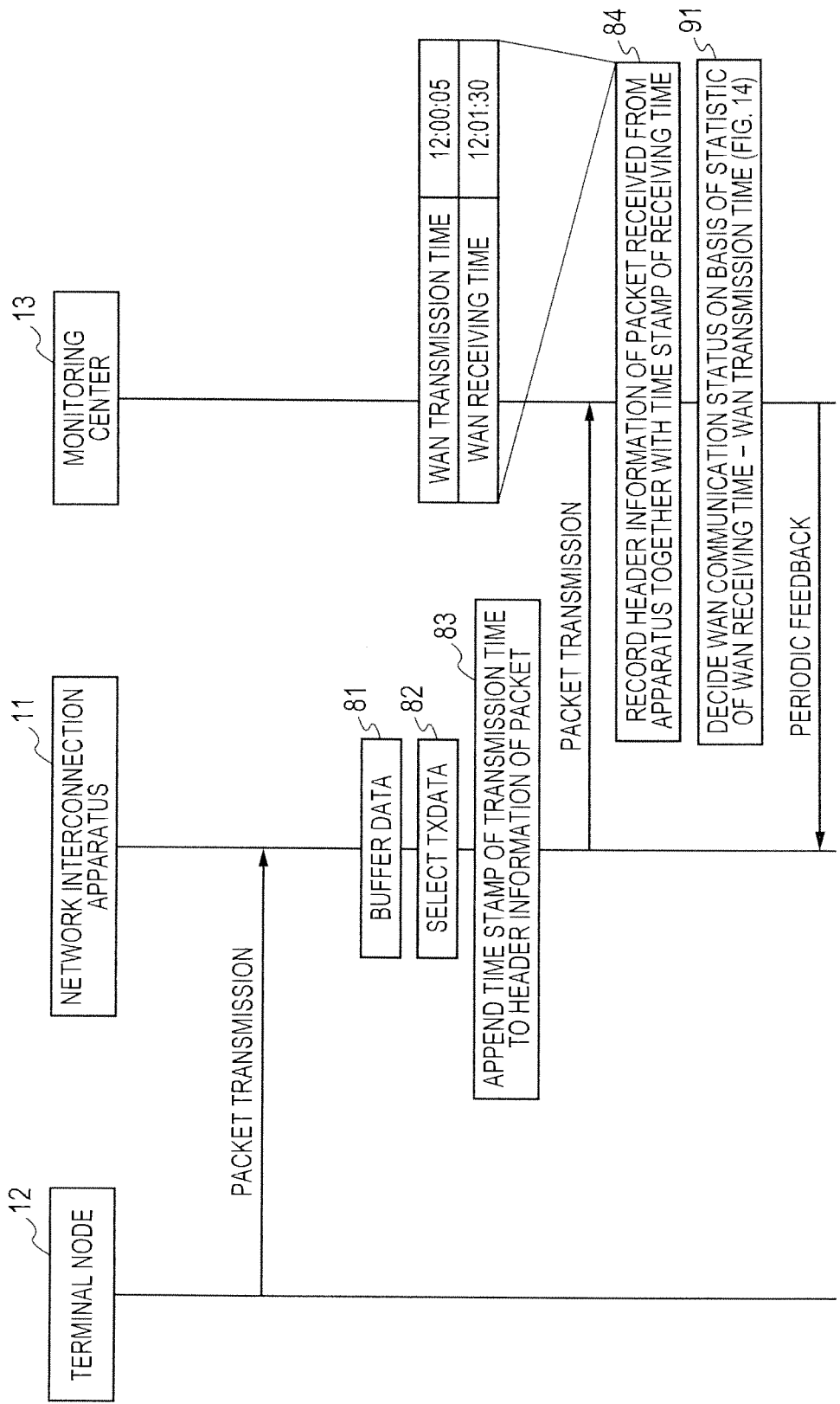

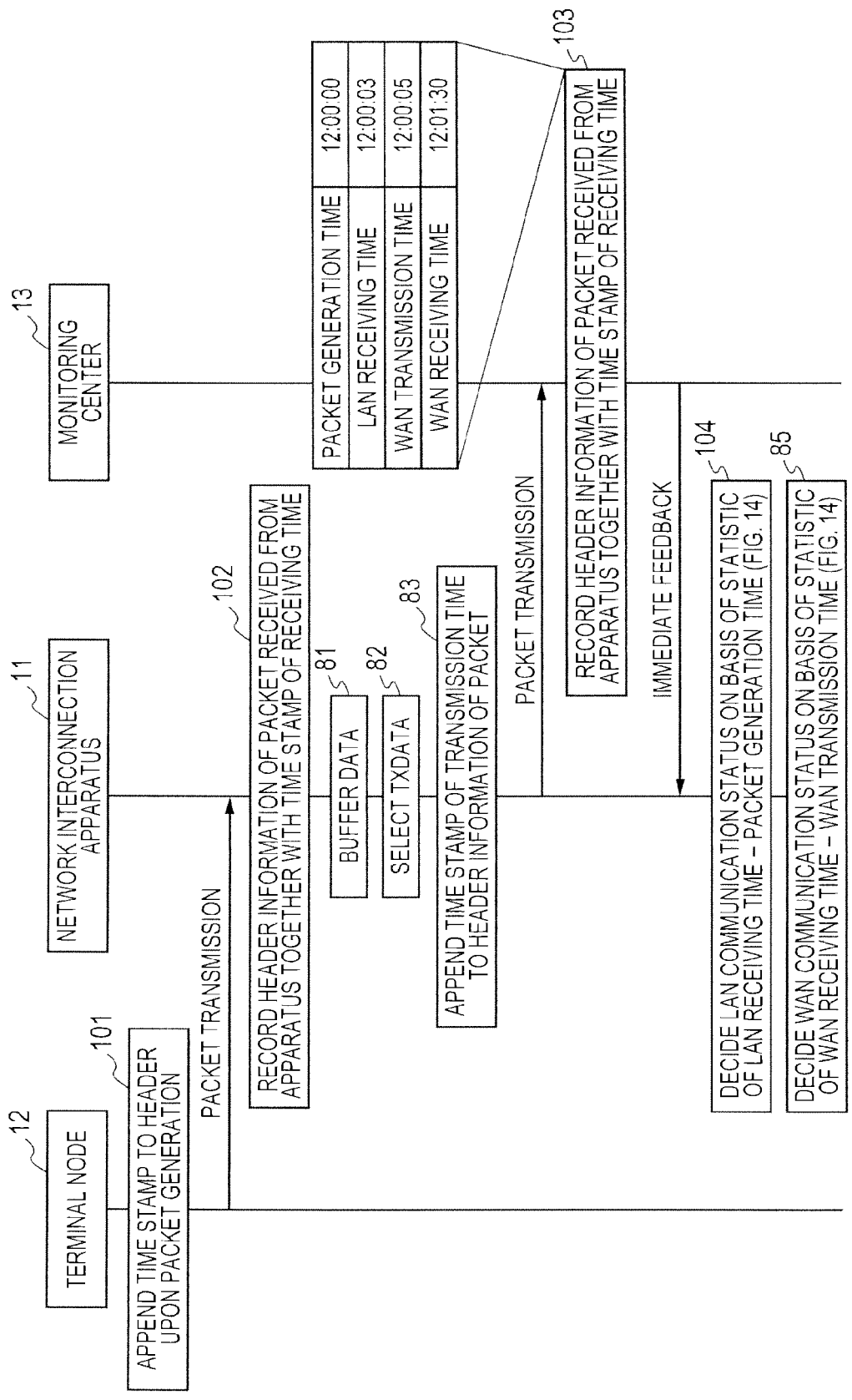

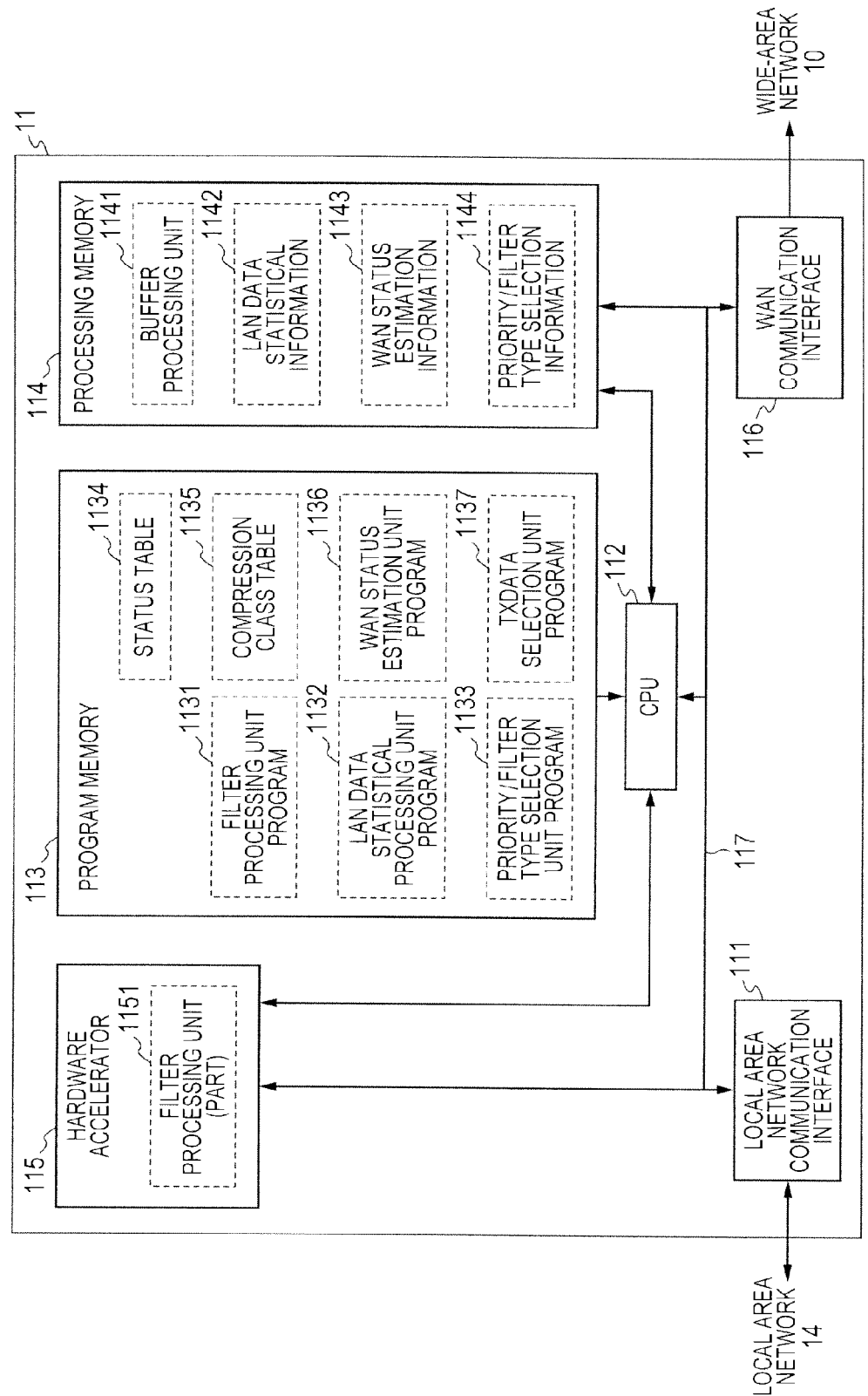

FIG. 17A

| COMPRESSION CLASS | COMPRESSION RATE | TXDATA TRANSMISSION ORDER | | FILTER TYPE |
|---|---|---|---|---|
| | | NODE TYPE | NODE ID | |
| 1 | 1.0 | CAMERA FOR VIDEO SURVEILLANCE | 1 | NO FILTERING |
| | NO COMPRESSION | ... | ... | ... |
| | | CAMERA FOR VIDEO SURVEILLANCE | n | NO FILTERING |
| | | VOICE TERMINAL NODE | 1 | COMPRESSION |
| | | ... | ... | ... |
| | | VOICE TERMINAL NODE | n | COMPRESSION |
| 2 | 0.6 | CAMERA FOR VIDEO SURVEILLANCE | 1 | THINNING, REDUCTION, COMPRESSION |
| | | ... | ... | ... |
| | | CAMERA FOR VIDEO SURVEILLANCE | n | THINNING, REDUCTION, COMPRESSION |
| | | VOICE TERMINAL NODE | 1 | COMPRESSION |
| | | ... | ... | ... |
| | | VOICE TERMINAL NODE | n | COMPRESSION |
| 3 | 0.4 | CAMERA FOR VIDEO SURVEILLANCE | 1 | FEATURE EXTRACTION |
| | | ... | ... | ... |
| | | CAMERA FOR VIDEO SURVEILLANCE | n | FEATURE EXTRACTION |
| | | VOICE TERMINAL NODE | 1 | COMPRESSION |
| | | ... | ... | ... |
| | | VOICE TERMINAL NODE | n | COMPRESSION |

FIG. 17B

| COMPRESSION CLASS | COMPRESSION RATE | TXDATA TRANSMISSION ORDER | | FILTER TYPE |
|---|---|---|---|---|
| | | NODE TYPE | NODE ID | |
| 1 | 1.0 / NO COMPRESSION | VOICE TERMINAL NODE | 1 | NO FILTERING |
| | | CAMERA FOR VIDEO SURVEILLANCE | 1 | NO FILTERING |
| | | ... | ... | ... |
| | | CAMERA FOR VIDEO SURVEILLANCE | n | NO FILTERING |
| | | VOICE TERMINAL NODE | 2 | COMPRESSION |
| | | ... | ... | ... |
| | | VOICE TERMINAL NODE | n | COMPRESSION |
| 2 | 0.6 | VOICE TERMINAL NODE | 1 | NO FILTERING |
| | | CAMERA FOR VIDEO SURVEILLANCE | 1 | THINNING, REDUCTION, COMPRESSION |
| | | ... | ... | ... |
| | | CAMERA FOR VIDEO SURVEILLANCE | n | THINNING, REDUCTION, COMPRESSION |
| | | VOICE TERMINAL NODE | 2 | COMPRESSION |
| | | ... | ... | ... |
| | | VOICE TERMINAL NODE | n | COMPRESSION |
| 3 | 0.4 | VOICE TERMINAL NODE | 1 | NO FILTERING |
| | | CAMERA FOR VIDEO SURVEILLANCE | 1 | FEATURE EXTRACTION |
| | | ... | ... | ... |
| | | CAMERA FOR VIDEO SURVEILLANCE | n | FEATURE EXTRACTION |
| | | VOICE TERMINAL NODE | 2 | COMPRESSION |
| | | ... | ... | ... |
| | | VOICE TERMINAL NODE | n | COMPRESSION |

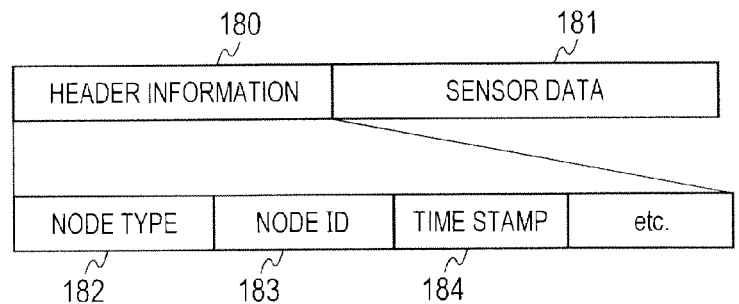

FIG. 19A

| COMPRESSION CLASS | COMPRESSION RATE | TXDATA TRANSMISSION ORDER ||  FILTER TYPE |
|---|---|---|---|---|
| | | NODE TYPE | NODE ID | |
| 1 | 1.0 (NO COMPRESSION) | SENSOR | 1 | NO FILTERING |
| | | CAMERA FOR VIDEO SURVEILLANCE | 5 | NO FILTERING |
| | | SENSOR | 2 | NO FILTERING |
| | | SENSOR | 3 | NO FILTERING |
| 2 | 0.6 | SENSOR | 1 | NO FILTERING |
| | | CAMERA FOR VIDEO SURVEILLANCE | 5 | CHANGING OF PICTURE SIZE, LOWERING OF FRAME RATE |
| | | SENSOR | 2 | ALARM DETECTION |
| | | SENSOR | 3 | ALARM DETECTION |
| 3 | 0.4 | SENSOR | 1 | ALARM DETECTION |
| | | CAMERA FOR VIDEO SURVEILLANCE | 5 | FEATURE EXTRACTION |
| | | SENSOR | 2 | ALARM DETECTION |
| | | SENSOR | 3 | ALARM DETECTION |

FIG. 19B

| COMPRESSION CLASS | COMPRESSION RATE | TXDATA TRANSMISSION ORDER | | FILTER TYPE |
|---|---|---|---|---|
| | | NODE TYPE | NODE ID | |
| 1 | 1.0 (NO COMPRESSION) | SENSOR | 2 | NO FILTERING |
| | | CAMERA FOR VIDEO SURVEILLANCE | 4 | NO FILTERING |
| | | SENSOR | 1 | NO FILTERING |
| | | SENSOR | 3 | NO FILTERING |
| 2 | 0.6 | SENSOR | 2 | NO FILTERING |
| | | CAMERA FOR VIDEO SURVEILLANCE | 4 | CHANGING OF PICTURE SIZE, LOWERING OF FRAME RATE |
| | | SENSOR | 1 | ALARM DETECTION |
| | | SENSOR | 3 | ALARM DETECTION |
| 3 | 0.4 | SENSOR | 2 | ALARM DETECTION |
| | | CAMERA FOR VIDEO SURVEILLANCE | 4 | FEATURE EXTRACTION |
| | | SENSOR | 1 | ALARM DETECTION |
| | | SENSOR | 3 | ALARM DETECTION |

MONITORING SYSTEM, DEVICE, AND METHOD

The present invention relates to a monitoring system, or more particularly, to a monitoring technology for implementing priority control in consideration of bandwidth limitation of a broadband network.

BACKGROUND ART

In recent years, there has been an increasing demand for performing monitoring or maintenance of facilities including a boiler and thermal power turbine or monitoring of energy consumption remotely at a center far away from a site. Data items of sensors or cameras for video surveillance generated at a terminal of such a monitoring system are ideally all collected to the center side. Along with an increase in the number of sensors or cameras for video surveillance, it has become difficult to collect all of the data items into the center side all the time, due to a limitation on available traffic capacity of a network.

In order to cope with the foregoing circumstances, for example, Patent Literature 1 has disclosed a technology that controls a priority of transfer and display of picture data sent from a camera on the basis of priority information obtained through communication between a mobile node and a stationary node.

CITATION LIST

Patent Literature

Patent Literature 1: Japanese Patent Application Laid-Open Publication No. 2009-171471

SUMMARY OF INVENTION

Technical Problem

As factors of difficulty in collecting all data items, factors presented below are conceivable.

Since the number of terminals supporting high data rates such as a data rate for a motion picture of a camera has increased, a total capacity for data to be generated within a network exceeds the available traffic capacity of the network (normally, on the order of 100 Mbps to 10 Gbps on the Ethernet (registered trademark)).

Due to a statistical multiplexing effect, a difference between a mean value of all traffic volumes and a maximum value thereof is large. If a network is designed to fit the worst condition, it will be over-engineered.

When a public network such as the Internet is utilized, a traffic volume to be generated under the same network cannot be estimated.

In particular, when wireless system is utilized, available traffic capacity of a network varies depending on a radio-wave propagation condition.

Further, even when a traffic capacity of a network is sufficient, if a public network (especially, with a pay-as-you-go type of fee) is utilized, there is a need for suppressing a communication cost to a necessary minimum.

As mentioned above, a traffic capacity of a network is often insufficient or variable. Therefore, when all data items cannot be uploaded to a center all the time, a combination of a method of ensuring a bandwidth for high priority data all the time through quality-of-service (QoS) bandwidth guarantee, and a method of transmitting the largest possible number of data items within a range permitted through best-effort communication. Further, if a priority varies depending on abnormality information or alert on a monitoring object, it is possible to change a priority order of data items having a bandwidth guaranteed by the QoS.

However, assume that information with a low data rate, but should be reliably transmitted at fixed time intervals, such as the data of a temperature sensor, coexists with information with a high data rate, but with a low priority in normally condition, such as the data of a camera for video surveillance. In this case, if a QoS-guaranteed bandwidth remains unchanged, and the priority of the data of the camera for video surveillance is raised when an alarm is detected, the QoS-guaranteed bandwidth becomes fully occupied by the camera data, and the sensor data cannot be transmitted. When an attempt is made to widen the QoS guaranteed bandwidth when the alarm is detected, such an incident that the necessary QoS guaranteed bandwidth cannot always be preserved is conceivable, though it depends on a traffic state of a network at that time.

An objective of the present invention is to address the foregoing various problems and to provide a monitoring system capable of implementing priority control in consideration of bandwidth limitation for a network.

Another objective of the present invention is to provide a communication control apparatus and method capable of, when all data items cannot be uploaded to a monitoring center all the time because information a data rate for which is low and which should be reliably transmitted at regular intervals, and information the data rate for which is high and a priority of which is normally low coexist, and a traffic capacity of a network is insufficient or varies, minimizing a data size for sucking up to the monitoring center while sustaining performance of a monitoring system.

Solution to Problem

In order to accomplish the foregoing objects, according to an aspect of the present invention, there is provided a monitoring system employing a network interconnection apparatus that interconnects a first network, on which plural terminal nodes are connected, and a second network on which a monitoring center is connected. The network interconnection apparatus selects transmission data items, which are transmitted to a host node such as the monitoring center on the second network, on the basis of a priority order of the transmission data items dependent on event statuses of the plural terminal nodes, and selects a data compression method for the transmission data items according to the event statuses and the communication condition of the network.

In order to accomplish the aforesaid objects, according to an aspect of the present invention, there is provided a communication control apparatus that implements control so as to receive data items sent from plural terminal nodes over a first network, and transmit the data items to a monitoring center over a second network. The communication control apparatus includes a communicating section that communicates with the first network and second network, a processing section, and a memory section. The processing section extracts event statuses by performing filtering processing on the data items received from the plural terminal nodes via the communicating section, estimates the communication condition of the second network on the basis of receiving data or the like received from the monitoring center via the communicating section, selects a compression class for data items, which should be transmitted, according to the communication condition, and determines a priority order of the data items, which should be transmitted, and a compression method therefor on the basis of the event statuses and compression class.

Further, in order to accomplish the aforesaid objects, according to an aspect of the present invention, there is provided a communication control method for a communication apparatus that includes a communicating section, a processing section, and a memory section, that receives data items from plural terminal nodes over a first network, and transmits the data items to a monitoring center over a second network. The processing section extracts event statuses on the basis of the data items received from the plural terminal nodes via the communication unit, estimates the communication condition of the network on the basis of receiving data received from the monitoring center via the communication unit, selects a compression class for data items, which should be transmitted, according to the communication condition, and determines the priority order of the data items, which should be transmitted, and a compression method therefor on the basis of the event statuses and compression class.

Advantageous Effects of Invention

According to the aspects of the present invention, even when all data items generated on a first network cannot always be transmitted over a second network, a transmission data size over the second network can be minimized without degradation in performance of a monitoring system. Further, even when a public network is used, the cost of communication can be suppressed.

BRIEF DESCRIPTION OF DRAWINGS

FIG. 4 is a diagram showing a processing flow for a priority/filter type selection unit relating to the first embodiment.

FIG. 5A is a diagram showing an example of tables for respective statuses relating to the first embodiment.

FIG. 5B is a diagram showing an example of a compression class table relating to the first embodiment.

FIG. 6A is a diagram showing an example of elements of a status table relating to the first embodiment.

FIG. 6B is a diagram showing another example of the elements of the status table relating to the first embodiment.

FIG. 7 is a diagram for explaining an advantage of a monitoring system in accordance with the first embodiment.

FIG. 8 is a diagram for explaining a communication flow for deciding a communication condition of a wide-area network relating to the first embodiment.

FIG. 9 is a diagram for explaining a communication flow for deciding the communication condition of the wide-area network relating to the first embodiment.

FIG. 10 is a diagram for explaining a communication flow for deciding the communication condition of the wide-area network relating to the first embodiment.

FIG. 11 is a diagram showing an example of a configuration of a network interconnection apparatus relating to the first embodiment.

FIG. 17A is a diagram showing an example of elements of a status table relating to the fourth embodiment.

FIG. 17B is a diagram showing another example of the elements of the status table relating to the fourth embodiment.

FIG. 18 is a diagram showing an example of the contents of information, which is transmitted from a terminal node to a network interconnection apparatus, and a format for the information which relates to the examples 1 and 4.

FIG. 19A is a diagram showing another example of the elements of the status tables shown in FIG. 6A and FIG. 6B respectively.

FIG. 19B is a diagram showing another example of the elements of the status tables shown in FIG. 6A and FIG. 6B respectively.

DESCRIPTION OF EMBODIMENTS

Various embodiments of the present invention will be described below in conjunction with the drawings. Incidentally, in the present description, features to be implemented in various types of software to be executed by a central processing unit (CPU) shall be expressed as "programs," "processing units," "modules," or "units."

First Embodiment

Figure 1:
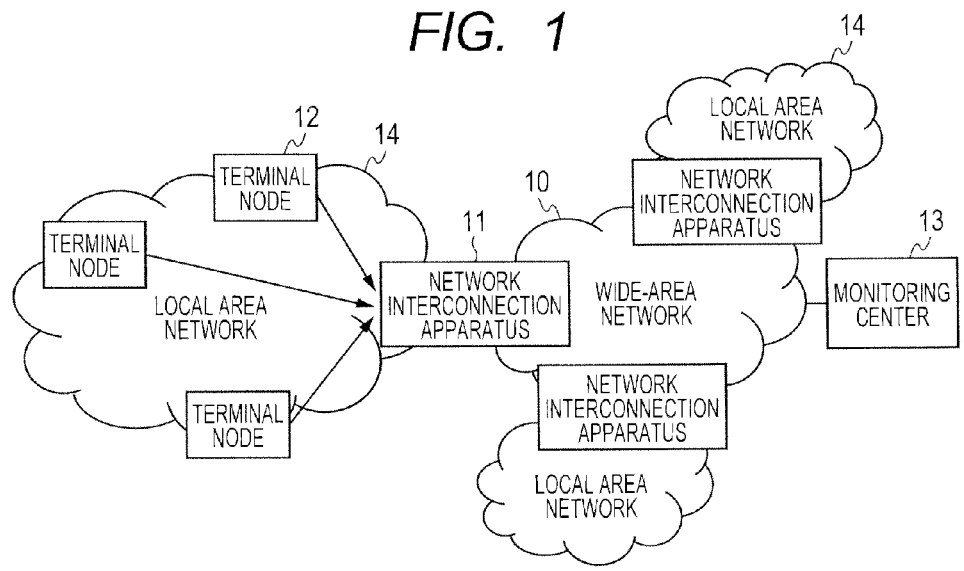
FIG. 1 is an overall configuration diagram of a communication system in accordance with a first embodiment of the present invention.

FIG. 1 shows an overall configuration of a communication system, which can implement various kinds of monitoring, in accordance with a First embodiment. In the drawing, reference numerals 10 and 14 denote a wide-area network abbreviated to a WAN, and a local-area network abbreviated to a LAN. Reference numeral 11 denotes a network interconnection apparatus that interconnects the networks. On the LAN 14 functioning as a first network, plural terminal nodes 12 that are various sensors including temperature sensors and cameras for video surveillance are connected. On the WAN 10 functioning as a second network, a monitoring center 13 that is a host node is connected. In the present system configuration that is a bilayer model, the network interconnection apparatus 11 functions as an edge node of each of the networks. Needless to say, the first network and second network are not limited to the cited LAN and WAN.

Figure 2:
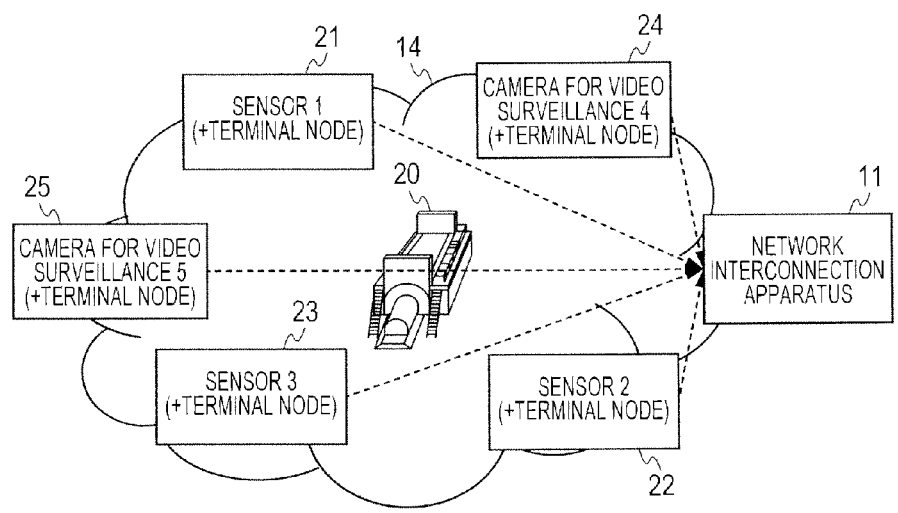
FIG. 2 is a diagram showing an example of a topology of a local network in the first embodiment.

FIG. 2 shows an example of a more concrete configuration of the LAN 4 functioning as the first network of the present embodiment. In the drawing, reference numeral 20 denotes a utility under monitor that is an object of monitoring, and reference numerals 21 to 25 denote a sensor 1, sensor 2, sensor 3, camera for video surveillance 4, and camera for video surveillance 5 that are the terminal nodes 12 shown in FIG. 1. As for the LAN 14 in the drawing, various sensor data items concerning an operating environment of the utility under monitor 20, and monitored picture data items are transmitted from the sensors and cameras for video surveillance onto the WAN 10, which functions as the second network, via the network interconnection apparatus 11.

Specifically, the monitoring system of the present embodiment shown in FIG. 1 and FIG. 2 has such a constitution that: the sensors 21 to 23 and cameras for video surveillance 24 and 25 are disposed around the utility under monitor 20; and after data items are once gathered to the network interconnection apparatus 11 which functions as an edge node of the LAN 14, the data items are gathered to the monitoring center 13 over the WAN 10.

In the monitoring system of the present embodiment, as a concrete example, each of the sensor data items of the sensors 21 to 23 can be transmitted at 1 kbps without compression, and can be compressed to be transmitted at 0.2 kpbs at the least through filtering processing, which will be described later, such as averaging or feature extraction. In addition, as for each of data items sent from the cameras 24 and 25, one of five steps of 4 kbps, 16 kbps, 32 kbps, 64 kpbs, and 128 kbps can be selected based on image quality. Needless to say, the data rates are not limited to the above ones.

Referring to FIG. 18, a description will be made of the contents of information, which is transmitted from the terminal node 12 to the network interconnection apparatus, and a format (packet format). The terminal node 12 transmits header information 180 and sensing information 181 that contains any of various sensor data items and a picture inputted from the sensor or camera for video surveillance connected to the terminal. The header information 180 contains a node type 182 indicating a type of terminal node or a type of connected device (sensor, camera for video surveillance, or the like), a node ID 183 for use in discriminating a terminal node from other plural terminals, and a time stamp 184 on a time when the sensing information is acquired. In the present embodiment, the node type falls into two types of "sensor" and "camera for video surveillance," and the node ID ranges from 1 to 5. The node ID may be, like that in the present embodiment, a serial number irrespective of whether the node type is "sensor" or "camera for video surveillance," or may be assigned for each node type, such as, "sensor 1" or "camera for video surveillance 1."

Figure 12:
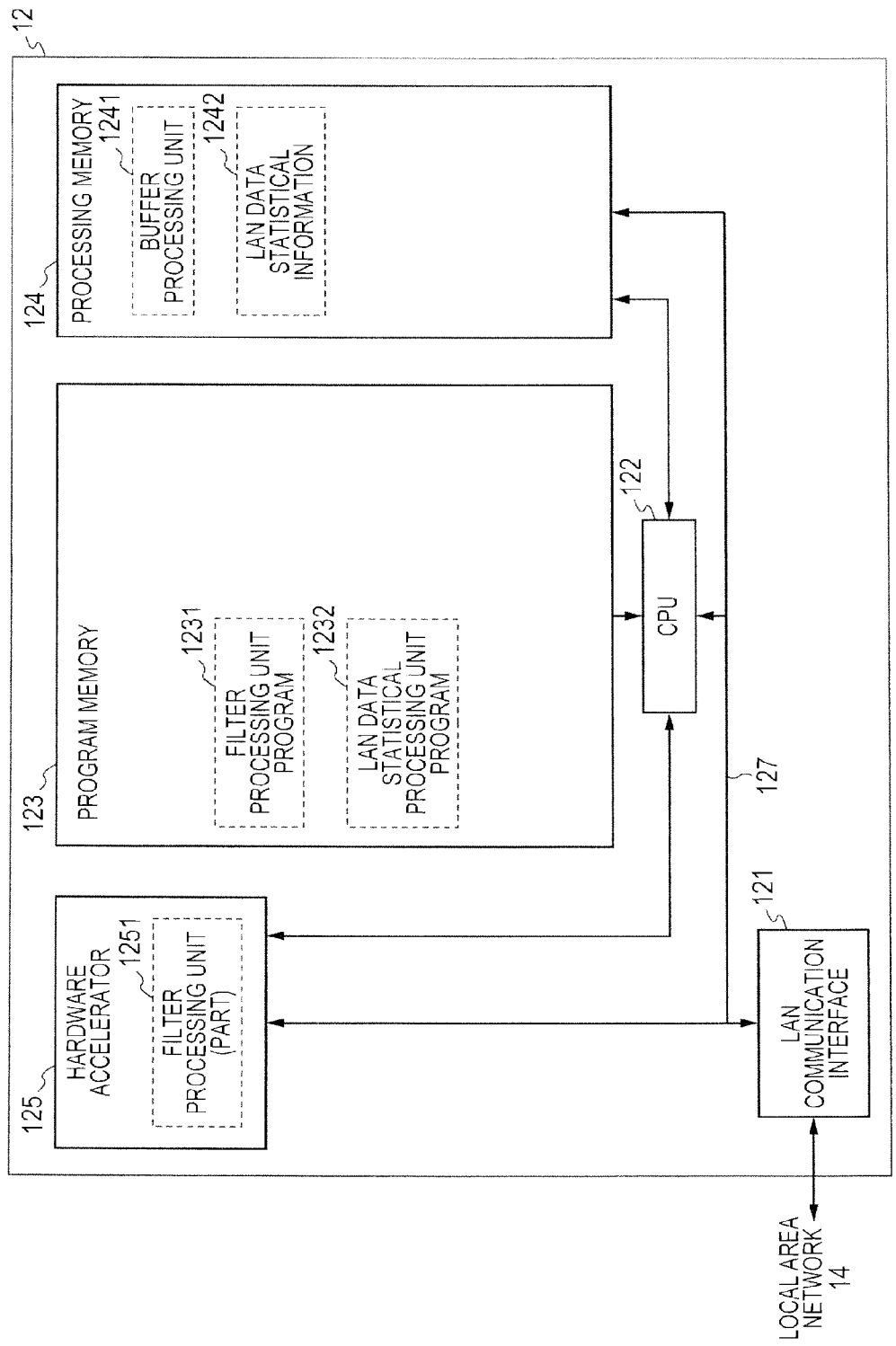
FIG. 12 is a diagram showing an example of a configuration of a terminal node relating to the first embodiment.
Figure 13:
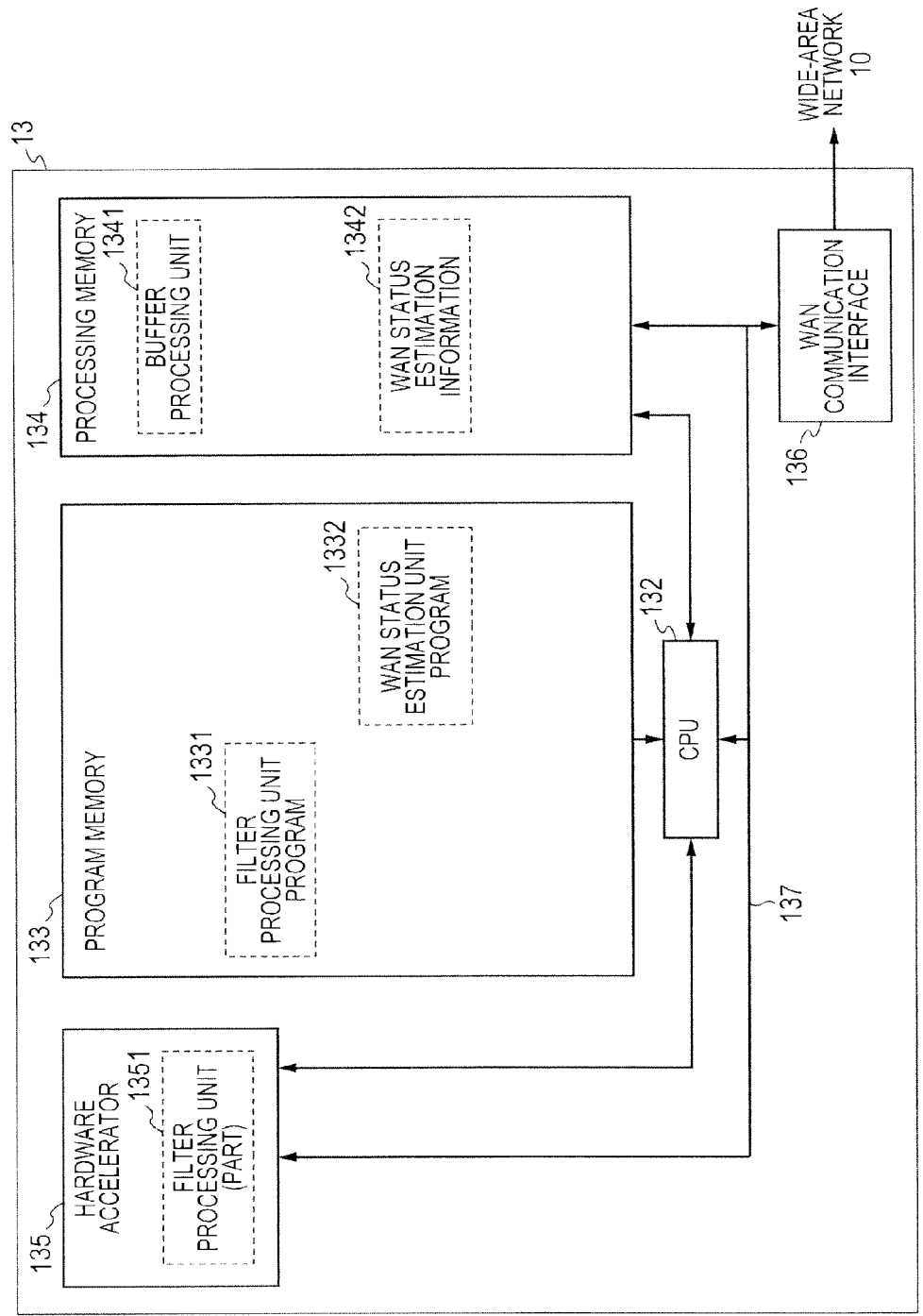
FIG. 13 is a diagram showing an example of a configuration of a monitoring center relating to the first embodiment.

Referring to FIG. 11, FIG. 12, and FIG. 13, examples of the internal configurations of the network interconnection apparatus 11, terminal node 12, and monitoring center 13 included in the overall system configuration of the present embodiment shown in FIG. 1 will be described below.

FIG. 11 shows an example of the network interconnection apparatus 11. In the drawing, the network interconnection apparatus 11 includes a LAN communication interface 111 and WAN communication interface 116 that are connected onto the LAN 14 and WAN 10 respectively, a central processing unit (CPU) 112 serving as a processing section and being connected onto an internal bus 117 that links the interfaces, a hardware accelerator 115 serving as the processing section, a processing memory 114 serving as a memory section, and a program memory 113 serving as the memory section in which programs to be run by the CPU 112 are stored. Various tables to be described later may be stored in either the processing memory 114 serving as the memory section or the program memory 113. Now, the hardware accelerator 115 is such that part of software arithmetic such as that of the filter processing unit 33, which is executed by the CPU 112, is replaced with an action of a hardware circuit, and the hardware circuit acts as a filter processing unit 1151 so as to speed up the arithmetic. For example, the hardware accelerator 115 executes FFT arithmetic, error correction decoding arithmetic such as turbo coding, or compression and decompression of an MPEG picture. A hardware accelerator locally procurable as a field programmable gate array (FPGA) circuit IP may be employed.

Figure 3:
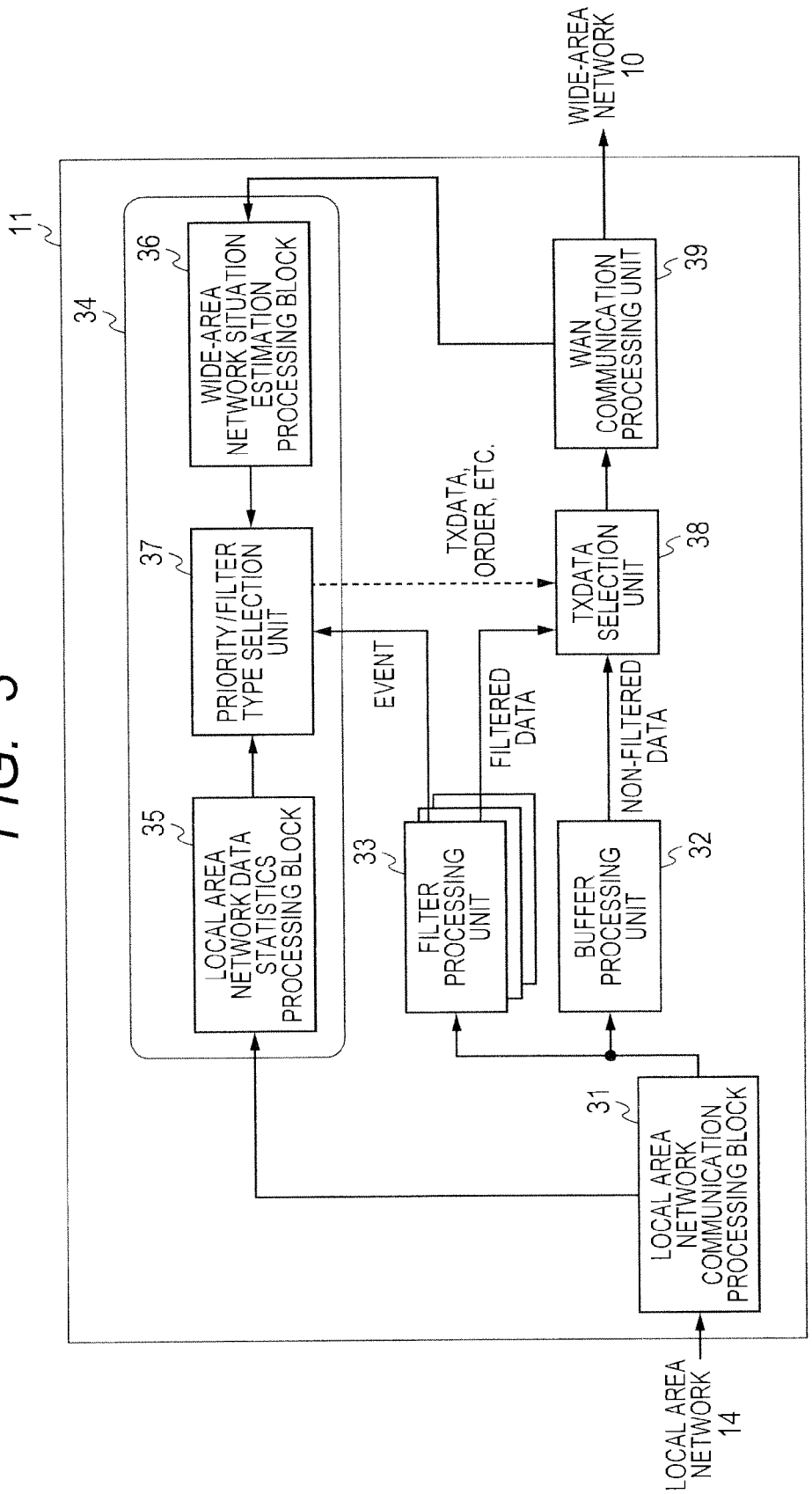
FIG. 3 is a diagram showing an example of a network interconnection apparatus relating to the first embodiment.

In the program memory 113, the processing units shown in FIG. 3, a filtering program 1131 that handles the tables shown in FIG. 5A and FIG. 5B, a LAN data statistics program 1132, a priority/filter type selection program 1133, a WAN status estimation program 136, a transmission data selection program 1137, a status table 1134, and a compression class table 1135 are stored. In the processing memory 114, a buffering area 1141 serving as an area of each program, LAN data statistical information 1142, WAN status estimation information 1143, and priority/filter type selection information 1144 are included according to the running situation of the program.

FIG. 12 shows an example of the terminal node 12. In the drawing, the terminal node 12 includes, in addition to a sensor capability or camera capability of each of the aforesaid terminal nodes, block elements shown in FIG. 12. Specifically, the terminal node 12 includes a LAN communication interface 121 which is connected onto the LAN 14, and includes a CPU 122, a processing memory 124, and a program memory 123 which are connected onto an internal bus 127 coupled to the interface. Each of the terminal nodes 12 uses the CPU 122, processing memory 124, and program memory 123 to process data sent from each sensor-capability section or camera-capability section whose illustration is omitted, and transmits the resultant data onto the LAN 14.

In the same drawing, the hardware accelerator 125 has part thereof replaced with a filter processing unit 1251. In addition, a filtering program 1231 and LAN data statistics program 1232 are stored in the program memory 123. In the processing memory 124, a buffering area 1241 serving as an area of each program and LAN data statistical information 1242 are included according to the running situation of the program.

FIG. 13 shows an example of the monitoring center 13. In the drawing, the monitoring center 13 includes a WAN communication interface 136 that is connected onto the WAN 10, and includes a CPU 132, a hardware accelerator 135, a processing memory 134, and a program memory 133 which are connected onto an internal bus 137 coupled to the interface.

Even in the configuration in the drawing, the hardware accelerator 135 has part thereof replaced with a filter processing unit 1351. In the program memory 133, a filtering program 1331 and WAN status estimation program 1332 are stored. In the processing memory 134, a buffering area serving 1341 as an area of each program and WAN status estimation information 1342 are included according to the running situation of the program.

FIG. 3 is a diagram showing a configuration of the network interconnection apparatus 11 that functions as an edge node of the first embodiment. In the drawing, reference numerals 31 to 39 denote processing blocks realized by software, which is executed by the processing section of the network interconnection apparatus 11, or by dedicated hardware such as FPGAs, and denote a LAN communication processing unit, buffer processing unit, filter processing unit, priority control unit, LAN data statistical processing unit, priority/filter type selection unit, WAN status estimation unit, transmission data selection unit, and WAN communication processing unit respectively. The WAN status estimation unit 36 implements processing of regularly monitoring a communication condition of the WAN 10, that is, a mean of rates at which data can substantially be transmitted.

The LAN communication processing unit 31 is a communication interface with respect to the LAN 14. The buffer processing unit 32 functions as a data buffer that utilizes a memory.

The filter processing unit 33 performs reversible processing such as compression processing on the header information 180 out of information, which is sent from the terminal node and described in conjunction with FIG. 18, and performs irreversible processing such as quantization processing on the sensing information 181. The contents of the filtering processing of the filter processing unit 33 may be read as a filtering processing library incorporated in advance in the apparatus 11 that is an edge node, or may be distributed from the monitoring center that is a host node.

As the reversible processing, difference calculation processing for calculating a difference from a reference value of sensing information provided by a sensor, packet generation processing for gathering plural pieces of sensing information, and compression processing for compressing header information in compliance with a defined communications protocol (for example, defined in the IETF standard RFC4944) are cited.

As the irreversible processing, discarding processing for discarding unnecessary sensing information, mean calculation processing for calculating a mean of pieces of sensing information, maximum value/minimum value detecting/deciding processing, abnormal value deciding processing, sampling and thinning processing in a time direction, quantization processing, frame rate lowering processing for camera picture information, picture size changing processing, and feature extraction processing such as face detection or motion detection are cited.

Assuming that precision in sensing information is degraded or the meaning is varied due to irreversible processing, if the buffer processing unit 32 is used to buffer unfiltered data into the network interconnection apparatus 11 serving as an edge node, when the unfiltered data is transmitted as it is or becomes necessary later, the host node can access the apparatus 11 that is the edge node so as to verify the unfiltered data.

The priority control unit 34 broadly provides, as shown in FIG. 3, three pieces of processing to be presented below. Namely, the priority control unit 34 includes the LAN data statistical processing unit 35, WAN status estimation unit 36, and priority/filter type selection unit 37. These pieces of processing can be implemented through software processing to be achieved when the CPU 132 runs the programs that are stored in the aforesaid program memory 133 shown in FIG. 11 and that describe the pieces of processing.

The WAN status estimation unit 36 estimates a communication condition such as a throughput or delay of the WAN 10, which is used to transmit sensing information acquired by the edge node to the host node by means of the WAN communication processing unit 39, and notifies the priority/filter type selection unit 37 of the communication condition.

The WAN 10 falls into a closed network dedicated to an object system and an open network such as the Internet or a cellular phone network. A certain data size may always be guaranteed as a data size (bandwidth) capable of being selected or may not be guaranteed because traffic on the network is time-sequentially varied. When the bandwidth is guaranteed, the WAN status estimation unit 36 preserves information on a bandwidth guaranteed at the time of setting. When the bandwidth is varied, such a method is adopted that: a measurement packet containing a time stamp and using window size information, which is defined in the transmission control protocol/Internet protocol (TCP/IP), as reference information is regularly transferred between the edge node and host node; and a transmission delay is calculated as a difference between a receiving time of the measurement packet and the time stamp contained in the packet.

The LAN data statistical processing unit 35 measures a communication condition such as a throughput or delay of the LAN 14, which is used when the edge node acquires sensing information from a sensor, or what amount of data having what priority is contained, and notifies the priority/filter type selection unit 37 of the communication condition.

Based on three inputs of the communication condition of the WAN (a data size at which data can be transmitted) notified by the WAN status estimation unit 36, the communication condition of the LAN 14 (a data size at which data should be transmitted and a priority distribution) notified by the LAN data statistical processing unit 35, and filtered data (a result of abnormal value decision) notified by the filter processing unit 33, the priority/filter type selection unit 37 determines how to perform filtering processing (filtering condition) on data sent from what terminal, and in what order data items are transmitted. The priority/filter type selection unit 37 notifies the transmission data selection unit 38 of the results including the determined filtering condition and transmission order.

FIG. 4 is a diagram showing a processing flow of the priority/filter type selection unit 37 of the priority control unit 34.

FIG. 4 shows an example of an action flow for the determination method. In FIG. 4, first, in an initial state (40), an event condition is sensed (41) from, for example, a result of abnormality decision that is filtered data notified by the filter processing unit 33, an event status of the LAN is decided (42). What is referred to as abnormality decision to be performed by the filter processing unit 33 is software processing such as abnormal value decision based on a result of difference calculation from a reference value of sensing information provided by a temperature sensor or microphone, or figure detection based on feature extraction such as face detection or motion detection.

Thereafter, a status table which should be referenced and in which data compression methods are specified is selected (43) based on the event status. A compression ratio is calculated as a ratio of a data size at which data should be transmitted to a data size at which data can be transmitted, and the selected status table is referenced in order to determine (44) a transmission order and filter type suitable for the compression ratio. In the present embodiment, for the determination, the LAN data statistical processing unit 35 performs state decision (45) on the LAN, and the WAN status estimation unit 36 performs state decision (46) on the WAN. Based on the results of the state decisions, a compression class associated with the network states is selected (47) from a compression class table to be described later in order to designate the transmission order and filter type. Needless to say, the filter type encompasses software-based compression methods such as sampling and thinning processing in a time direction, quantization processing, frame rate lowering processing for camera picture information, and picture size changing processing.

Next, referring to FIG. 5A, FIG. 5B, FIG. 6A, and FIG. 6B, a concrete example of a priority control method that takes accounts of bandwidth limitation for a network by the network interconnection apparatus 11 will be described by utilizing the aforesaid configuration of the monitoring system of the present embodiment. The network interconnection apparatus 11 sets plural status tables, which define priority orders in which data items sent from sensors and cameras are transmitted onto a network, and switches the tables to be validated according to an event condition such as Normal or Sensor Alarm Detected. Thus, a priority control method taking account of bandwidth limitation is realized.

FIG. 5A shows an example of event status conditions, that is, tables for respective statuses and elements in the present embodiment. In the drawing, reference numerals 51, 52, and 53 denote transmission data selection tables for statuses A, B, and C. In the transmission data selection table 53 for status C whose example is shown, a compression ratio associated with a compression class, a transmission order, and a filter type are included as the table elements. The compression class takes on a value equal to or larger than 1. As shown in the transmission data selection table 53 for status C, when the compression class is 1, the compression ratio is 1.0. Data to be transmitted is not compressed. As for the transmission order, it is defined that α, β, and γ are transmitted in that order. When the compression class is 1, for example, a data size is 259 kpbs. The data size is set to decrease to be 131 kpbs, etc., 8.6 kbps, and 4.6 kbps along with a rise in the compression class.

FIG. 5B shows an example of a compression class table 54 for calculating a compression class on the basis of a network state or communication condition in the present embodiment. As apparent from the drawing, in the present embodiment, any of compression classes 1 to 4 is selected based on a LAN state specified on the axis of ordinates of the table 54 and a WAN status specified on the axis of abscissas thereof. Based on the selected or determined compression class, the corresponding compression class in each event status table is selected or determined.

FIG. 6A and FIG. 6B show examples of a status table to be employed under, as a concrete example of a status which corresponds to an event condition shown in FIG. 5A, such an event condition that an abnormality has occurred in the sensor 1 or sensor 2, that is, the detected temperature of a temperature sensor has changed abruptly. In FIG. 6A, a status table 61 includes, like the table 53 in FIG. 5A, a compression class, compression ratio, transmission order, and filter type as table elements. The status table 61 has, as shown in the drawing, compression ratios of 1.0, 0.6, and 0.4 in association with the compression classes 1, 2, and 3. As the transmission order, the status table 61 has, as shown in the drawing, such a transmission order that data of the sensor 1 in which an abnormality has occurred is transmitted first among data items of the sensors 1 to 3, camera for video surveillance 4, and alarms 1 to 3. Further, as the filter type, for the sensors 1 to 3, no filtering or transmission of only a result of alarm detection is selected. For the camera for video surveillance, no lowering of a frame rate, changing of a picture size and lowering of a frame rate, or transmission of only a result of feature extraction such as presence or absence of a human being is appropriately selected. For example, at the compression class 3, a result of alarming in the sensor 1 in which an abnormality has occurred, a result of feature extraction for the camera for video surveillance 4, and results of alarm detection in the other sensors 2 and 3 are transmitted.

Likewise, in a status table 62 in FIG. 6B, compression ratios of 1.0, 0.6, and 0.3 are included in association with compression classes 1, 2, and 3. Transmission orders are determined as shown in the drawing. Further, filter types are as shown in the drawing. A difference from the status table 61 in FIG. 6A lies in a point that the sensors 1 and 2 and the cameras for video surveillance 5 and 4 are switched in the transmission orders and filter types. This is intended to transmit data of a sensor, in which an abnormality has occurred, as a top priority. Specifically, when an event status condition is abnormality has occurred, data of a sensor which has detected the occurrence of the abnormality is given the top priority. Data of a camera for video surveillance or data of any other sensor is given the second highest priority according to a compression class associated with a traffic situation of a network.

Incidentally, the various tables shown in FIG. 5A, FIG. 5B, FIG. 6A, and FIG. 6B are mere examples. Needless to say, other elements can be adopted.

FIG. 19A and FIG. 19B show variants of FIG. 6A and FIG. 6B. FIG. 19A and FIG. 19B are more concrete examples of FIG. 6A and FIG. 6B respectively. In an item of a transmission order, the node type 182 and node ID 183 which have been described in conjunction with FIG. 18 are designated in order to signify from which terminal data is received. The pieces of information on the node type and node ID are contained in header information of a packet sent from the terminal node 21. Data that is not designated in the item of the transmission order (for example, a picture of the camera for video surveillance 4 of the present embodiment in FIG. 19A) is transferred to the network interconnection apparatus 11 but is not transmitted to the monitoring center 13. In an item of a filter type, a kind of processing to be applied by the filter processing unit 33 is designated for data specified in the item of the transmission order. For example, at a compression class 1, unfiltered data of the sensor 1, unfiltered data of the camera for video surveillance 5, unfiltered data of the sensor 2, and unfiltered data of the sensor 3 are designated in that order. At a compression class 3, a result of alarm detection in the sensor 1 (event status), a result of feature extraction for the camera for video surveillance 5, a result of alarm detection in the sensor 2, and a result of alarm detection in the sensor 3 are designated in that order.

In the present embodiment, after priorities are determined, that is, a priority order is determined, a compression method for sensor data and data of a camera for video surveillance is selected in line with a bandwidth in which the data can be transmitted. Therefore, data items from all terminal nodes can be transmitted irrespective of a traffic state of a network.

Referring to FIG. 8, FIG. 14, FIG. 9, and FIG. 10, examples of a communication flow for deciding a communication condition of a network in the monitoring system of the present embodiment will be described below. The communication flows in FIG. 8, FIG. 9, and FIG. 10 depend on whether an entity that assigns a time or an entity that decides the communication condition of a network is the network interconnection apparatus 11, monitoring center 13, or terminal node 12.

First, in the case of the communication flow shown in FIG. 8, the terminal node 12 in the monitoring system transmits a packet to the network interconnection apparatus 11 over the LAN 14. The apparatus 11 then uses the aforesaid buffer processing unit to perform buffering (81), and selects (82) packet data, which is to be transmitted, from the buffered packet data items. Thereafter, the apparatus appends (83) a time stamp of a transmission time to the header information of the selected packet, and transmits the packet to the monitoring center 13 over the WAN 10. The monitoring center 13 records (84) the header information of the received packet together with a time stamp of a receiving time. FIG. 8 shows an example of the WAN transmission time and WAN receiving time.

The monitoring center 13 transmits time difference information or the like as sequential feedback information to the network interconnection apparatus 11. The network interconnection apparatus 11 having received the sequential feedback information stores the feedback information on the time difference between the WAN receiving time and WAN transmission time, and decides the communication condition of the WAN 10 through statistical processing. The statistical processing in the network interconnection apparatus will be described in conjunction with FIG. 14. The statistical processing can be implemented through software processing to be achieved when the CPU 132 runs a statistical processing program stored in the aforesaid program memory 133 shown in FIG. 11. The statistical processing program is included in the WAN status estimation unit 37 in the configuration of the network interconnection apparatus 11 shown in FIG. 3.

Figure 14:
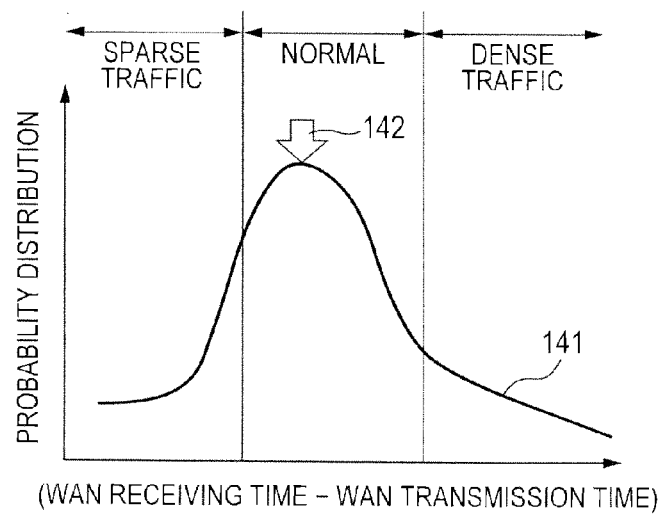
FIG. 14 is a diagram showing a graph of a probability distribution of statistical data items of time differences relating to the first embodiment.

Reference numeral 141 in FIG. 14 denotes a graph indicating a probability distribution of statistical data items of time differences. The axis of abscissas for the graph 141 in FIG. 14 indicates the time differences, and the axis of ordinates indicates the occurrence probability distribution of stored data delays (time differences). The statistical processing program decides a communication condition according to in which of "sparse traffic," "normal traffic," and "dense traffic" domains, which are preset using thresholds, a delay corresponding to a time difference associated with a probability density of a maximum of 142 is included. As an index for the decision, aside from the value associated with the maximum probability density, a value associated with a cumulative probability that is larger than a predetermined value of n percent (cumulative probability >n %) may be adopted. In addition, domain segmentation is not limited to the illustrated segmentation into three domains but finer segmentation will do. In either case, such a statistical processing program is easily available.

Next, the case of the processing flow shown in FIG. 9 will be described below. A description will be made mainly of a difference from FIG. 8. When selected packet data is transmitted from the network interconnection apparatus 11, the monitoring center 13 records (84) header information of the received packet together with a time stamp of a receiving time, performs statistical processing on time difference information on the basis of the time stamp, and decides (91) the communication condition of the WAN 10. In the processing flow of FIG. 9, unlike that of FIG. 8, the monitoring center 13 decides the communication condition of the WAN 10 through statistical processing, and periodically feeds back the result to the network interconnection apparatus 11 of the packet transmission source. Needless to say, the periodic feedback information is transmitted to the aforesaid WAN status estimation unit 37 in FIG. 3.

Next, the case of the processing flow shown in FIG. 10 will be described below. In the case of the processing flow, when the terminal node 12 generates a packet, a time stamp is appended (101) to a header, and the packet is transmitted. The network interconnection apparatus 11 records (102) the header information of the received packet together with a time stamp of a receiving time. Thereafter, the same processing as that in FIG. 8 or FIG. 9 is performed. The monitoring center 13 records (103) the header information of the packet received from the apparatus 11 together with the time stamp of the receiving time. In the case of the present processing flow, the time stamp to be recorded contains, in addition to a WAN transmission time and WAN receiving time, a packet generation time and LAN receiving time. Herein, needless to say, what is referred to as the LAN receiving time is a time stamp of a time when the network interconnection apparatus 11 has received a packet over the LAN 14.

The time stamps are transmitted to the network interconnection apparatus 11 through sequential feedback. The apparatus 11 decides (104) the communication condition of the LAN 14 on the basis of difference information between the LAN receiving time and packet generation time, and also decides (85) the communication condition of the WAN 10. In a variant, the packet generation time and LAN receiving time of a packet to be transmitted from the network interconnection apparatus 11 to the monitoring center 13 may be stored in the apparatus 11, and the stored data may be used to perform statistical processing on a time difference in order to decide the communication condition of the LAN 14. In either case, needless to say, the LAN data statistical processing unit 35 that is one of the components of the network interconnection apparatus 11 shown in FIG. 3 performs the statistical processing.

Next, referring to FIG. 7, an effect of a data transmission method in the aforesaid first embodiment will be described below. In FIG. 7, a conventional method that does not utilize the constitution of the present embodiment and a method of the present embodiment are shown in comparison with each other. In the conventional method shown in the upper part of FIG. 7, at a normal time, sensor data items 71 to 73 of the sensors 1 to 3 or the like such as temperature sensors whose priorities are high, for which a low data rate is set, and which should be reliably transmitted at regular intervals has a bandwidth guaranteed by the QoS, and a certain transmission data size can be ensured. In contrast, data of the camera for video surveillance 4 for which a high data rate is set and whose priority is low at a normal time is transmitted as frequently as possible within a transmittable range through best-effort communication. The transmission data size therefore varies. Assuming that occurrence of an abnormality in an object of monitoring is recognized through alarm detection, and the priority of the data 74 of the camera for video surveillance is raised, the QoS bandwidth guarantee is monopolized by the camera for video surveillance data 74. The sensor data items 72 and 73 whose priorities are low cannot therefore be transmitted. Further, when an attempt is made to widen a QoS-guaranteed bandwidth only at the time of alarm occurrence, a necessary QoS-guaranteed bandwidth cannot be preserved depending on the traffic state of the network.

In contrast, in the case of the present embodiment shown in the lower part of FIG. 7, as mentioned above, after priorities are determined, that is, a priority order is determined, a compression method for the sensor data 71, data 74 of the camera for video surveillance, and sensor data items 72 and 73 is selected in line with an available transmission bandwidth 75. Therefore, data items from all the terminal nodes can always be transmitted irrespective of the traffic state of the network.

As described so far, in the monitoring system of the present embodiment, a priority order for data items from plural terminal nodes is determined according to statuses, and a compression method is selected in line with an available transmission bandwidth on a network. Therefore, all the data items from the plural terminal nodes can be transmitted in a transmission order dependent on the priorities irrespective of the traffic state of the network.

Second Embodiment

Next, as a second embodiment of a WAN status estimation unit, a case where window size information for flow control under the TCP is employed will be described below.

In flow control under the TCP, when a data receiving side returns an Acknowledge (ACK) signal, which signifies that data is received, to a transmitting side, window size information is posted in line with the format of a TCP header. The window size information indicates a packet volume the receiving size can receive at a time, that is, an availability of a buffer in the receiving size. When a window size is small, the transmitting side diminishes the packet volume to be transmitted so as to minimize congestion of packets. When the window size is large, the transmitting side increases the packet volume to be transmitted so as to raise a throughput. The window size information does not always agree with a WAN status described in relation to the first embodiment, but can be utilized as one of indices for deciding the WAN status.

The WAN status estimation unit 37 of the network interconnection apparatus 11 shown in FIG. 3 extracts the window size information from the TCP header and utilizes it.

Third Embodiment

Next, as a third embodiment, an example of the configuration of another communication system of a monitoring system will be described below.

Figure 15:
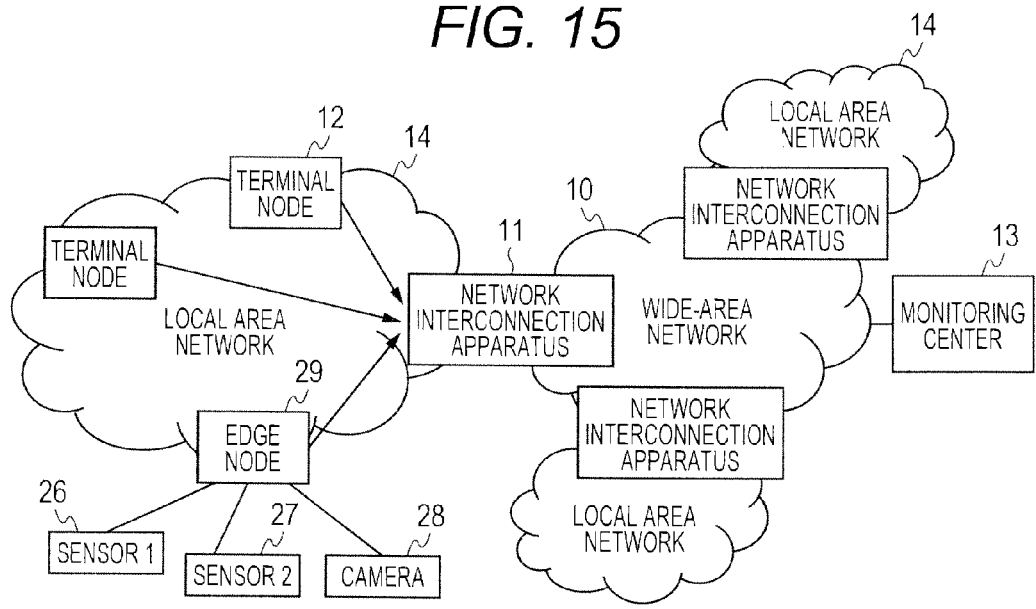
FIG. 15 is an overall configuration diagram of a communication system in accordance with a third embodiment of the present invention.

FIG. 15 shows an overall configuration of a monitoring system of the third embodiment capable of realizing various kinds of monitoring. In the drawing, a difference from the communication system shown in FIG. 1 is that the communication system shown in FIG. 15 is a three-layered model. Sensors 26 and 27, a camera for video surveillance 28, and a utility under monitor are connected to an edge node 29 of a local area network (LAN) 14. The edge node 29 performs filtering on sensor data or camera data. Namely, part of the role of a filter processing unit of the network interconnection apparatus 11 in the first or second embodiment is assigned to the edge node.

Fourth Embodiment

Next, as a fourth embodiment, an example of the configuration of a remote monitoring system for a plant will be described below.

Figure 16:
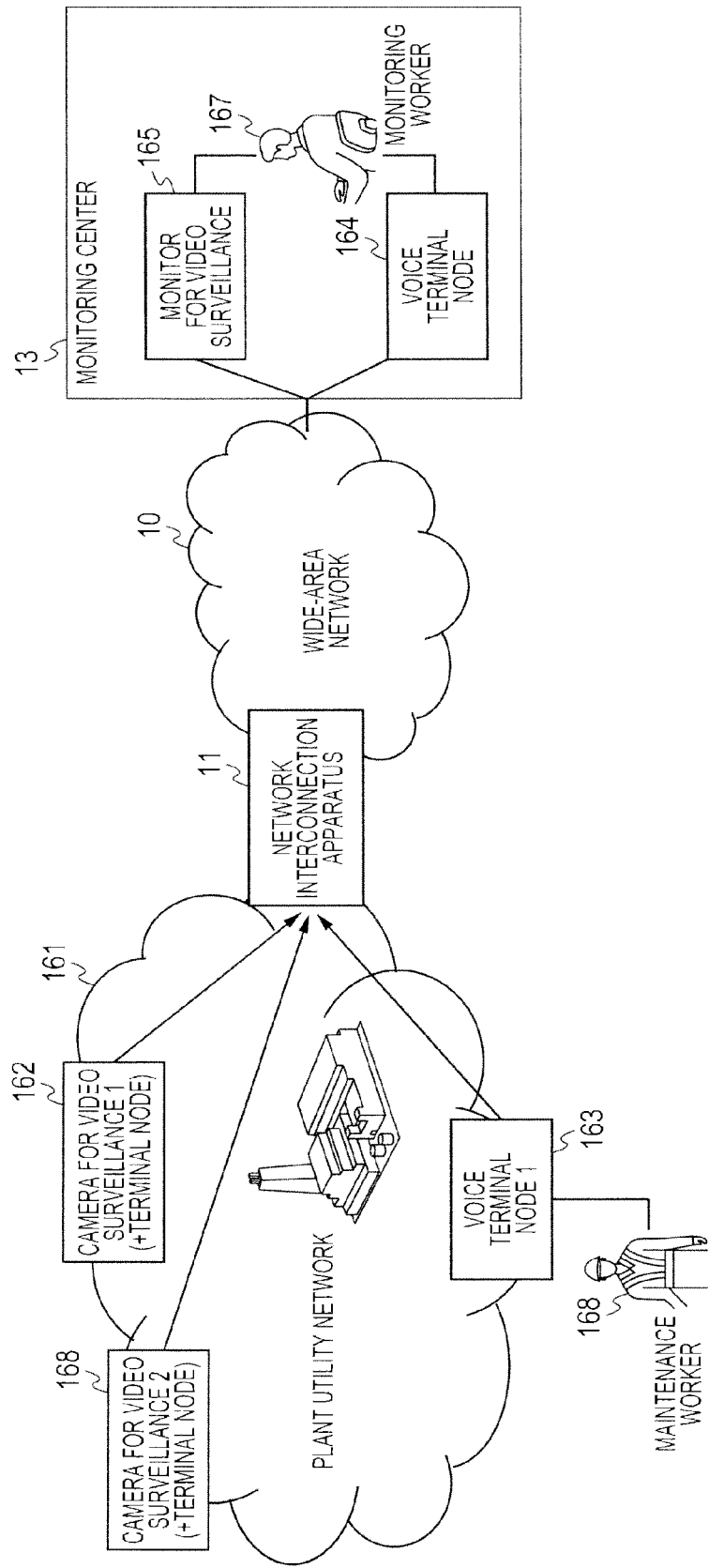
FIG. 16 is an overall configuration diagram of a communication system in accordance with a fourth embodiment of the present invention.

FIG. 16 shows an overall configuration of a remote monitoring system for a plant in accordance with the fourth embodiment. In the drawing, a camera for video surveillance 1 (162), camera for video surveillance 2 (168), and voice terminal node 1 (163) are connected onto a plant utility network 161. A network interconnection apparatus 11 performs filtering on a camera picture and audio data, and is connected to a voice terminal node 164 and a monitor for video surveillance 165 in a monitoring center 13 over a wide-area network (WAN) 10. A picture sent from the camera for video surveillance 162 included in the plant is displayed on the monitor for video surveillance 165 in the monitoring center. A monitoring worker 167 in the monitoring center 13 looks at the picture on the monitor for video surveillance 165, and grasps a situation in the plant. A maintenance worker 166 in the plant, if necessary, speaks to the monitoring worker 167 in the monitoring center on the voice terminal node 163 on the plant side and the voice terminal node 165 on the monitoring center side. Voice communication can be initiated by either the maintenance worker 166 or monitoring worker 167. In order to initiate voice communication, the maintenance worker 166 transmits a voice transmission initiation request command to the network interconnection apparatus 11 using the voice terminal node 163. Likewise, the monitoring worker 167 uses the voice terminal node 165 to transmit the voice transmission initiation request command to the network interconnection apparatus 11.

Even in the fourth embodiment, similarly to that in FIG. 4, processing of the priority/filter type selection unit 37 in the priority control unit 34 is carried out. In the present embodiment, as an event status that is a content obtained through event sensing 41, a status attained when an event concerning voice communication has been sensed, for example, when "a voice transmission initiation request command from the voice terminal node 163 or 165 has been sensed" or "voice transmission has been sensed through analysis of a transmission packet," and a status attained when the event is not sensed are conceivable.

FIG. 17A and FIG. 17B show examples of a status table to be employed in sensing a voice event. In FIG. 17A, a status table 171 includes, similarly to the table 53 in FIG. 5A, as table elements, a compression class, compression ratio, transmission order, and filter type, and specifies, as shown in the drawing, compression ratios of 1.0, 0.6, and 0.4 in association with compression classes 1, 2, and 3. In the item of the transmission order, a node type 182 and note ID 183 described in conjunction with FIG. 18 are designated in order to recognize from what node data has come. In the item of the filter type, a kind of processing to be applied by the filter processing unit 33 is designated for data specified in the item of the transmission order. In the present embodiment, the node type to be designated in the item of the transmission order falls into a "camera for video surveillance" and "voice terminal node." The node ID is, unlike that in the first embodiment, assigned for each node type, and ranges from 1 to n for the "camera for video surveillance" or "voice terminal node." The table 171 of FIG. 17A is supposed to be a status table to be employed when an event concerning voice is not sensed. As for the transmission order, the "cameras for video surveillance" 1 to n or "voice terminal nodes" 1 to n are designated in that order irrespective of the compression class. As for the "voice terminal node," "compression" is designated for the filter type irrespective of the compression class. The filter type for the "camera for video surveillance" depends on the compression class. For the compression class 1, no filtering is designated. For the compression class 2, thinning, reduction, and compression are designated. For the compression class 3, feature extraction is designated.

Likewise, a status table 172 of FIG. 17B is supposed to be a status table to be employed when an event concerning voice is sensed. A difference from the status table 171 of FIG. 17A lies in a point that the transmission order and filter type signify that data of the voice terminal node 1 in which a voice event has been sensed is transmitted by priority. To any other transmission data, filtering is applied according to a compression class selected through the processing flow in FIG. 4.

According to the fourth embodiment, the network interconnection apparatus 11 determines priorities of camera pictures and voice through even sensing concerning voice, and selects a compression class according to the states of the plant utility network and WAN. Thus, voice communication with high speech quality can be achieved irrespective of the traffic state of the network.

INDUSTRIAL APPLICABILITY

The present invention will prove useful as a monitoring system that employs sensors and cameras for video surveillance, or more particularly, as a monitoring technology for controlling priorities in consideration of bandwidth limitation for a wide-area network.

REFERENCE SIGNS LIST

10: wide-area network (WAN),
11: network interconnection apparatus
12: terminal node
13: monitoring center
14: local-area network (LAN)
20: utility under monitor
21: sensor 1
22: sensor 2
23: sensor 3
24: camera for video surveillance 4
25: camera for video surveillance 5
26, 27: sensor
28: camera 29: edge node
31: LAN communication processing unit
32: buffer processing unit
33: filter processing unit
34: priority control unit
35: LAN data statistical processing unit
36: WAN status estimation unit
37: priority/filter type selection unit
38: transmission data selection unit
39: WAN communication processing unit
51, 52, 53: transmission data selection table for status A, B, or C,
61, 62, 171, 172: status table
71, 72, 73: sensor data
74: data of camera for video surveillance
75: available transmission bandwidth
111, 121: LAN communication interface
112, 122, 132: CPU
113, 123, 133: program memory
114, 124, 134: processing memory
115, 135: hardware accelerator
116, 126, 136: WAN communication interface
117, 127, 137: internal bus
161: plant utility network
162, 168: camera for video surveillance
163, 164: voice terminal node
165: monitor for video surveillance
166: maintenance worker
167: monitoring worker
180: header information
181: sensing information
182: node type
183: node ID
184: time stamp

The invention claimed is:

1. A communication control apparatus that implements control so as to receive data items sent from a plurality of terminal nodes over a first network and transmit the data items to a monitoring center over a second network, comprising:
 a communication section that communicates with the first network and second network respectively;
 a processing section; and
 a memory section, wherein
 the processing section extracts event statuses on the basis of the data items received from the plurality of terminal nodes via the communication section, and estimates the communication condition of the second network;
 the processing section selects a compression class for the data items, which should be transmitted to the monitoring center, according to the communication condition of the second network; and
 the processing section determines a priority order of the data items, which should be transmitted, and a compression method on the basis of the event statuses and compression class.

2. The communication control apparatus according to claim 1, wherein the plurality of terminal nodes includes at least one sensor and at least one camera.

3. The communication control apparatus according to claim 1, wherein:
 the memory section stores a table in which a transmission order for the data items, which should be transmitted, dependent on the event statuses is recorded; and
 the processing section determines the transmission order for the data items, which should be transmitted, on the basis of the table dependent on the event statuses.

4. The communication control apparatus according to claim 1, wherein the processing section determines the communication condition of the second network on the basis of a time difference between a transmitted time of the data items onto the second network, and a received time of the data items at the monitoring center.

5. The communication control apparatus according to claim 1, wherein the processing section has the communication condition of the second network, which is determined by the monitoring center on the basis of a time difference between a transmitted time of the data items onto the second network, and a received time of the data items at the monitoring center, periodically fed back from the monitoring center.

6. The communication control apparatus according to claim 1, wherein the processing section estimates the communication condition of the network on the basis of data received from the monitoring center via the communication section.

7. The communication control apparatus according to claim 1, wherein: the memory section stores a plurality of tables, each of which stores a compression ratio associated with a transmission orderS forthc data items, which should be transmitted to the monitoring center, and a set of filters for the data items, dependent on each of the event statuses.

8. A communication control method for a communication apparatus that includes a communication section, processing section, and memory section, that receives data items sent from a plurality of terminal nodes over a first network, and that transmits the data items to a monitoring center over a second network, wherein:
 the processing section extracts event statuses on the basis of the data items received from the plurality of terminal nodes via the communication section, and estimates the communication conditions of the first and second networks respectively;
 the processing section selects a compression class for the data items, which should be transmitted to the monitoring center, according to the communication conditions of the first and second networks respectively, and determines a priority order of the data items, which should be transmitted, and a compression method on the basis of the event statuses and compression class.

9. The communication control method according to claim 8, wherein the plurality of terminal nodes includes at least one sensor and at least one camera.

10. The communication control method according to claim 8, wherein the processing section estimates the communication condition of the second network on the basis of data received from the monitoring center via the communication section.

11. The communication control method according to claim 8, wherein the processing section determines the communication condition of the second network on the basis of a time difference between a transmitted time of the data items onto the second network, and a received time of the data items at the monitoring center.

12. The communication control method according to claim 8, wherein the processing section has the communication condition of the second network, which is determined by the monitoring center on the basis of a time difference between a transmitted time of the data items onto the second network and a received time of the transmission data items at the monitoring center, periodically fed back from the monitoring center.

13. The communication control method according to claim 8, wherein:
the memory section stores a table in which a transmission order for the data items, which should he transmitted, dependent on the event statuses is recorded; and
the processing section determines the transmission order for the data items, which should be transmitted, on the basis of the table dependent on the vent statuses.

14. The communication control method according to claim 8, wherein: the memory section stores a plurality of tables, each of which stores a compression ratio associated with a transmission order for the data items, which should he transmitted to the monitoring center, and a set of filters for the data items, dependent on each of the event statuses.

* * * * *